No. 761,511. PATENTED MAY 31, 1904.
M. LANE.
BOOT FOR HORSES.
APPLICATION FILED SEPT. 1, 1903.
NO MODEL.
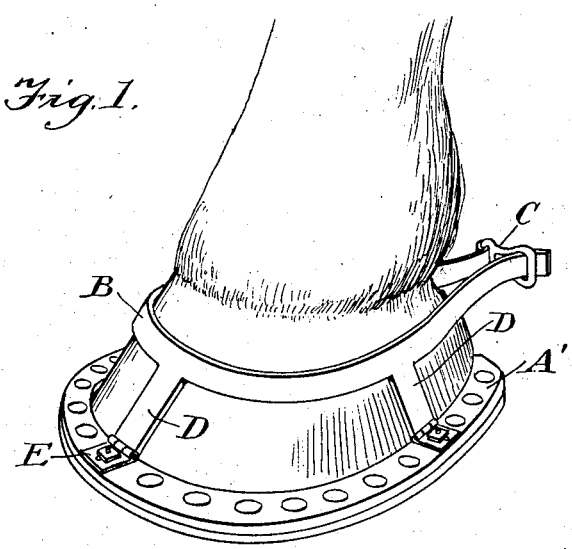
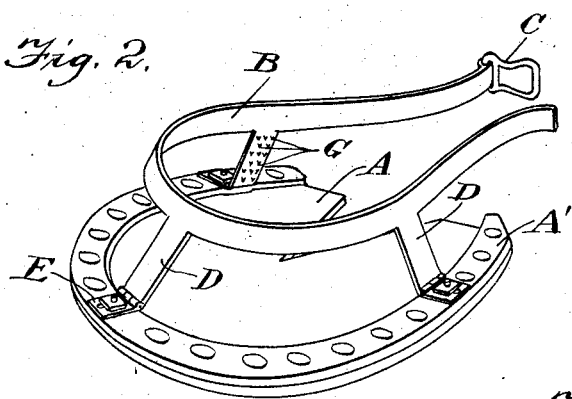
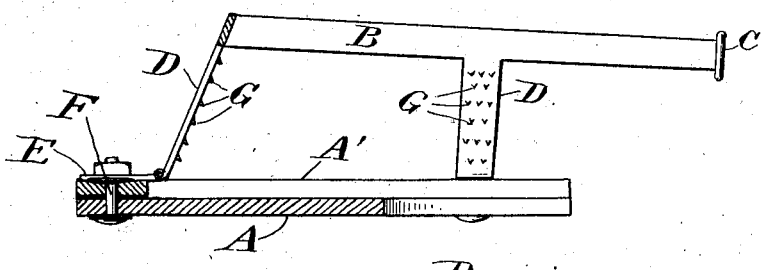
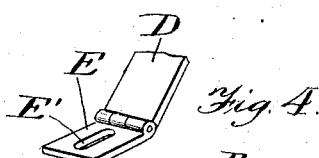
Witnesses:
H. B. Hallock
L. H. Monson
Inventor:
Moses Lane
By No. 761,511. Patented May 31, 1904.

UNITED STATES PATENT OFFICE.

MOSES LANE, OF FRANKFORD, PENNSYLVANIA.

BOOT FOR HORSES.

SPECIFICATION forming part of Letters Patent No. 761,511, dated May 31, 1904.

Application filed September 1, 1903. Serial No. 171,513. (No model.)

*To all whom it may concern:*

Be it known that I, MOSES LANE, a subject of the King of England, residing at Frankford, county of Philadelphia, and State of Pennsylvania, have invented a certain new and useful Improvement in Boots for Horses, of which the following is a specification.

My invention relates to a new and useful improvement in boots for horses, and has for its object to provide a removable boot which may be secured to the horse's hoof underneath the shoe and which will extend out around the hoof, and thus increase the surface coming in contact with the ground; and a further object of my invention is to provide a simple, durable, and easy means for securing and removing the boot from the hoof.

With these ends in view the invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a perspective view of my improved boot attached to the hoof of a horse; Fig. 2, a perspective view of the boot; Fig. 3, a longitudinal section through the same; Fig. 4, a perspective view of the lower portion of one of the hinges as adapted to be attached to the sole of the boot.

Where it is necessary to drive horses over a lawn or a leveled surface, it is customary to tie bagging around the hoofs of the horses. I provide flexible boots for the horse, which will prevent the shoes from cutting into the sod or ground and also increase the treading-surface, so as to prevent the sod or ground from becoming marred to any great extent by the feet of the horse.

The purpose of my invention is to provide a boot which may be easily and quickly attached to the hoof of the horse on such occasions.

A represents the sole of the boot, upon which the hoof of the horse rests. This sole is reinforced around the edge with an extra strip A', which will lie outside of the hoof when the boot is in use. This sole is made of sole-leather, and is therefore flexible and will not mar the sod or ground with which it comes in contact.

B is a spring-band adapted to surround the upper portion of the hoof, and the ends of this spring-band are secured together at the rear by means of an eyelet C, secured to one end of the band, the other end of the band passing through the eyelet, as shown in Fig. 1. Of course any suitable means could be used, if desired, to secure the ends of the band together.

D represents strips extending downward from the band, and the lower end of each of these strips is hinged to plates E, which plates are secured to the edges of the sole by means of bolts F. For the purpose of adjusting the plates E so that the boot may be applied to horses of different-sized hoofs I provide in the plates E slots E', through which the bolts F pass, so that the strips D may be adjusted toward or away from the center of the shoe to the limit of the slots. The inner surface of the strips D is provided with pointed projections G, which are adapted to embed themselves in the hoof of the horse and still further aid in securing the boot upon the hoof.

The great advantage of my invention is that I provide a boot which may be manufactured at a comparatively small cost, will be exceedingly light in weight, neat in appearance, and very durable, and can be easily attached and detached from the hoof in a short space of time, and another great advantage in this invention is that when the sole of the boot becomes worn out it may be removed and a new sole inserted in its place, still retaining the old fastening device, and this would create a great saving in cost.

Another great advantage consists in the adjustability of the fastening device, so that the same boot may be secured to horses with different-sized hoofs.

Of course I do not wish to be limited to the exact construction here shown, as slight modifications could be made without departing from the spirit of my invention.

Having thus fully described my invention, what I claim as new and useful is—

1. In a boot for horses, a sole made of leather or other flexible material adapted to extend out beyond the hoof, a spring-band adapted to surround the hoof near its upper portion, the ends of the spring-band adapted to approach one another at the rear, means for securing these ends together, and strips extending downward from the band and hinged to the sole, as and for the purpose specified.

2. In a boot for horses, a flexible sole upon which the hoof of the horse is adapted to rest, said sole extending outward from the hoof, a spring-band adapted to surround the hoof near its upper portion, the ends of the band approaching each other at the rear, means for securing these ends together, strips extending downward from the band, and plates adjustably secured upon the upper surface of the protruding rim of the sole, said plates being hinged to the strips; as and for the purpose specified.

3. In a boot for horses, a sole made of leather or similar material upon which the hoof of the horse is adapted to rest, said sole being reinforced by a strip secured upon the upper surface of the sole around its edge outside of the hoof, a spring-band adapted to surround the hoof near its upper portion, the ends of the band approaching each other at the rear, means for securing these ends together, strips extending downward from the band, plates arranged upon the upper surface of the reinforcing-strip of the sole, said plates being hinged to the lower ends of the strips, said plates being provided with slots, bolts passing upward through the sole and reinforcing-strip and through the slot of the plates, nuts threaded upon the upper ends of the bolts, and sharpened points protruding from the inner face of the strips, as and for the purpose specified.

In testimony whereof I have hereunto affixed my signature in the presence of two subscribing witnesses.

MOSES LANE.

Witnesses:
RICHARD H. GUKER,
CHAS. F. SORBER.